No. 728,984. PATENTED MAY 26, 1903.
G. M. RUST & E. J. FAULKNER.
WINDOW SHADE STOP.
APPLICATION FILED DEC. 16, 1901.
NO MODEL.
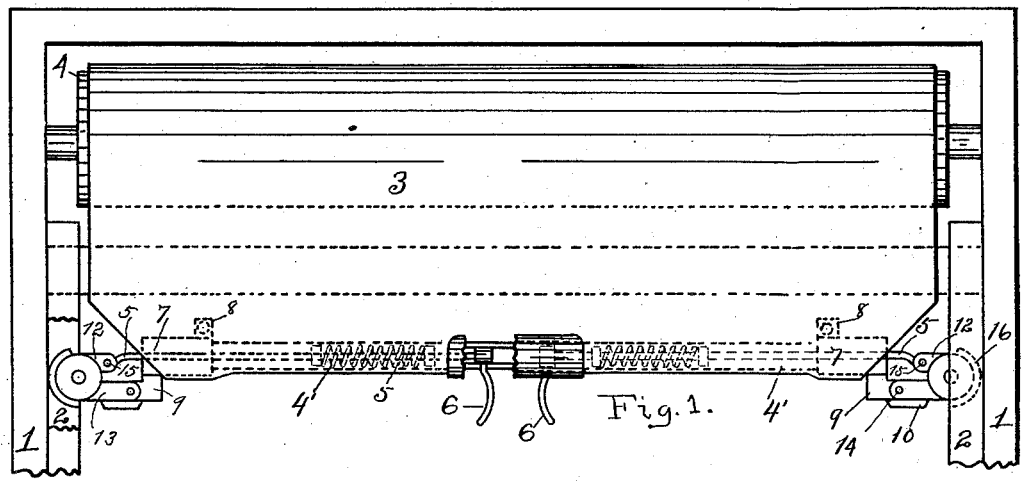
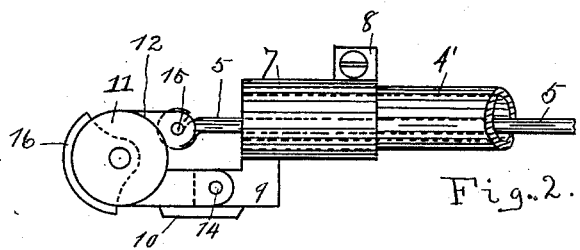
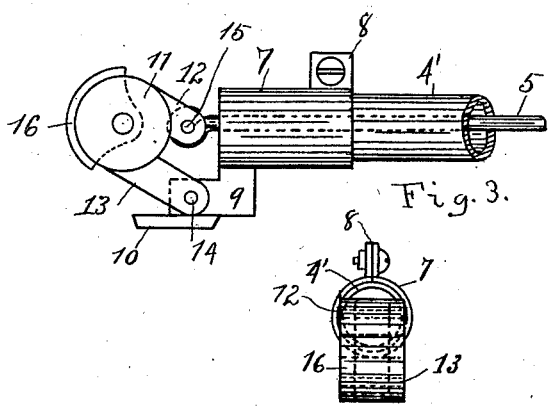
WITNESSES.
C. M. Theobald
Matthew Subler
Geo. M. Rust.
Edward J. Faulkner
INVENTORS.
By R. J. McCarty
ATTORNEY.

No. 728,984. Patented May 26, 1903.

UNITED STATES PATENT OFFICE.

GEORGE M. RUST AND EDWARD J. FAULKNER, OF DAYTON, OHIO.

WINDOW-SHADE STOP.

SPECIFICATION forming part of Letters Patent No. 728,984, dated May 26, 1903.

Application filed December 16, 1901. Serial No. 86,071. (No model.)

*To all whom it may concern:*

Be it known that we, GEORGE M. RUST and EDWARD J. FAULKNER, citizens of the United States, residing at Dayton, in the county of Montgomery and State of Ohio, have invented certain new and useful Improvements in Window-Shade Holders; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to new and useful improvements in window-shade holders which permit the shade to be drawn down or elevated and stopped instantly and held securely in any position against the tension of the shade-roller.

The object of the invention is to provide an adjustable stop for a window-shade, the same having the novel features hereinafter claimed.

Preceding a detail description of our invention reference is made to the accompanying drawings, of which—

Figure 1 is a front elevation of a portion of a window-frame, showing our improved shade-stop in position on a window-shade therein. Fig. 2 is an enlarged elevation of one of the stops. Fig. 3 is a similar view showing the dog elevated to a position to unlock the shade at one side. Fig. 4 is an end elevation of Fig. 2.

In a detail description similar reference characters indicate corresponding parts.

1 designates a portion of a window-frame. 2 designates the channel-bars on each side thereof.

3 is the window-shade, mounted to wind upon the usual roller 4. Secured to the lower end of the window-shade is a tubular rod 4', which incloses sliding rods 5 5. The inner ends of the sliding rods are provided with finger-pieces 6 6, by means of which said rods are drawn inwardly against spring-pressure, which normally maintains them outward in a well-known manner.

7 7 designate a collar or ferrule, one of which is adjustably attached to each of the outer ends of the tubular rod 4'. The attachment of said collars or ferrules is made by means of ears 8, which are tightened by means of screws, and thus clamp the said collars or ferrules around the ends of the tube. Projecting downwardly from the lower outer end of said ferrules 7 7 are brackets or arms 9 9 with extensions 10 10.

11 designates a circular clamp or dog mounted on each of the brackets 9 by being pivoted thereto at 14 by means of an arm 13, which projects from the rounded portion of said dog. When the dog at each side of the shade is occupying its lower or normal position, the arm 13 comes in contact with the extensions 10 of said brackets 9, as shown in Fig. 1. In this position the dogs 11 lock the shade in any desired position.

12 designates an upper extension or arm projecting from the upper side of each of the dogs 11. The outer ends of the rods 5 5 are pivoted at 15 to said extensions 12, so that when the rods 5 5 are drawn inwardly by inward pressure on the finger-pieces 6 6 the dogs 11 are elevated on their pivots 14, as shown in Fig. 3, and are thus released from contact with the interior surface of the window-frame on each side of the shade. The outer surface of the dogs 11 is incased by a suitable piece of rubber 16 or other friction-increasing substance in order that a proper contact of the dogs may be effected with the window-frame. As constant usage has a tendency to wear smooth or decrease the binding capacity of any surface, we have provided means for taking up this wear, consisting of the adjustable collars or ferrules 7.

Having described our invention, we claim—

1. In a window-shade holder, the combination with a tubular rod to which the lower edge of a window-shade is securable, and sliding rods in said tubular rod, of adjustable clamping-collars mounted on the outer ends of said tubular rod, brackets projecting downwardly and outwardly from said collars, circular clamps or dogs having lower arms by means of which pivotal connections are made with said brackets, and upper arms by means of which said clamps or dogs are pivotally connected to the outer ends of the sliding rods, and an elastic surface inclosing the outer sides of said clamps or dogs and by means of which a binding contact is obtained between said dogs and the window-frame, substantially as set forth.

2. In a window-shade holder, a tubular rod securable to a window-shade, spring-controlled sliding rods within said tubular rod, adjustable clamping-collars on the outer ends of said tubular rod, the said collars being provided with ears through which screws penetrate and whereby said collars are secured in any desirable position on the ends of said tubular rod, brackets 9 projecting from said adjustable collars, an extension 10 on each of said brackets, a circular clamp or dog having parallel arms 12 and 13, a pivotal connection between the arms 13 and the brackets 9, and a pivotal connection between the arms 12 and the ends of the sliding rods, the pivots between the arms 13 and brackets 9 being the fulcrums of said clamps or dogs, substantially as set forth.

3. In a window-shade holder, the combination with a tubular rod adapted to be secured to the lower end of a window-shade, sliding rods in said tubular rod, adjustable clamping-collars mounted on the outer ends of said tubular rod, brackets formed on said collars, circular clamps or dogs pivotally mounted on said brackets, said clamps or dogs being also pivoted to said sliding rods, an elastic surface inclosing the outer sides of said clamps or dogs, and a means on said brackets whereby said dogs are limited in one direction, substantially as described.

4. In a shade-holder, the combination with a tubular rod, of spring-pressed rods arranged within said tubular rod, friction dogs or clamps pivotally mounted on the outer ends of said rods, adjustable elements arranged on the outer ends of the tubular rod, brackets formed on said adjustable elements, means carried by said dogs or clamps whereby they are pivotally secured to said brackets, and means on said brackets and arranged in the several paths of said dogs or clamps whereby said dogs or clamps are limited in their downward movements, substantially as described.

In testimony whereof we affix our signatures in presence of two witnesses.

GEORGE M. RUST.
EDWARD J. FAULKNER.

Witnesses:
JOHN W. KALBFUS,
R. J. MCCARTHY.